O. PROELSS & W. S. HALL.
MURIATIC ACID TANK CAR.
APPLICATION FILED MAR. 5, 1910.

998,120.

Patented July 18, 1911.

2 SHEETS—SHEET 2.

Witnesses:

Inventors:
Otto Proelss
Walter S. Hall

UNITED STATES PATENT OFFICE.

OTTO PROELSS, OF KANSAS CITY, MISSOURI, AND WALTER S. HALL, OF ARGENTINE, KANSAS.

MURIATIC-ACID TANK-CAR.

998,120. Specification of Letters Patent. Patented July 18, 1911.

Application filed March 5, 1910. Serial No. 547,575.

*To all whom it may concern:*

Be it known that we, OTTO PROELSS, of Kansas City, in the county of Jackson and State of Missouri, and WALTER S. HALL, of Argentine, in the county of Wyandotte and State of Kansas, have invented certain new and useful Improvements in Muriatic-Acid Tank-Cars, of which the following is a specification.

Our invention relates to tank-cars for the transportation of muriatic acid and other similar liquids by rail; and the objects of our improvements are: first to provide means for dividing the carload in order to reduce the momentum effect upon the car and tanks; second, to provide a yielding connection between the car and tanks adapted to reduce the strain on the tanks caused by the momentum when the cars are bumped together; and third, to provide an improved tank construction. We have attained these objects by the construction illustrated in the accompanying drawings in which—

Figure 1:
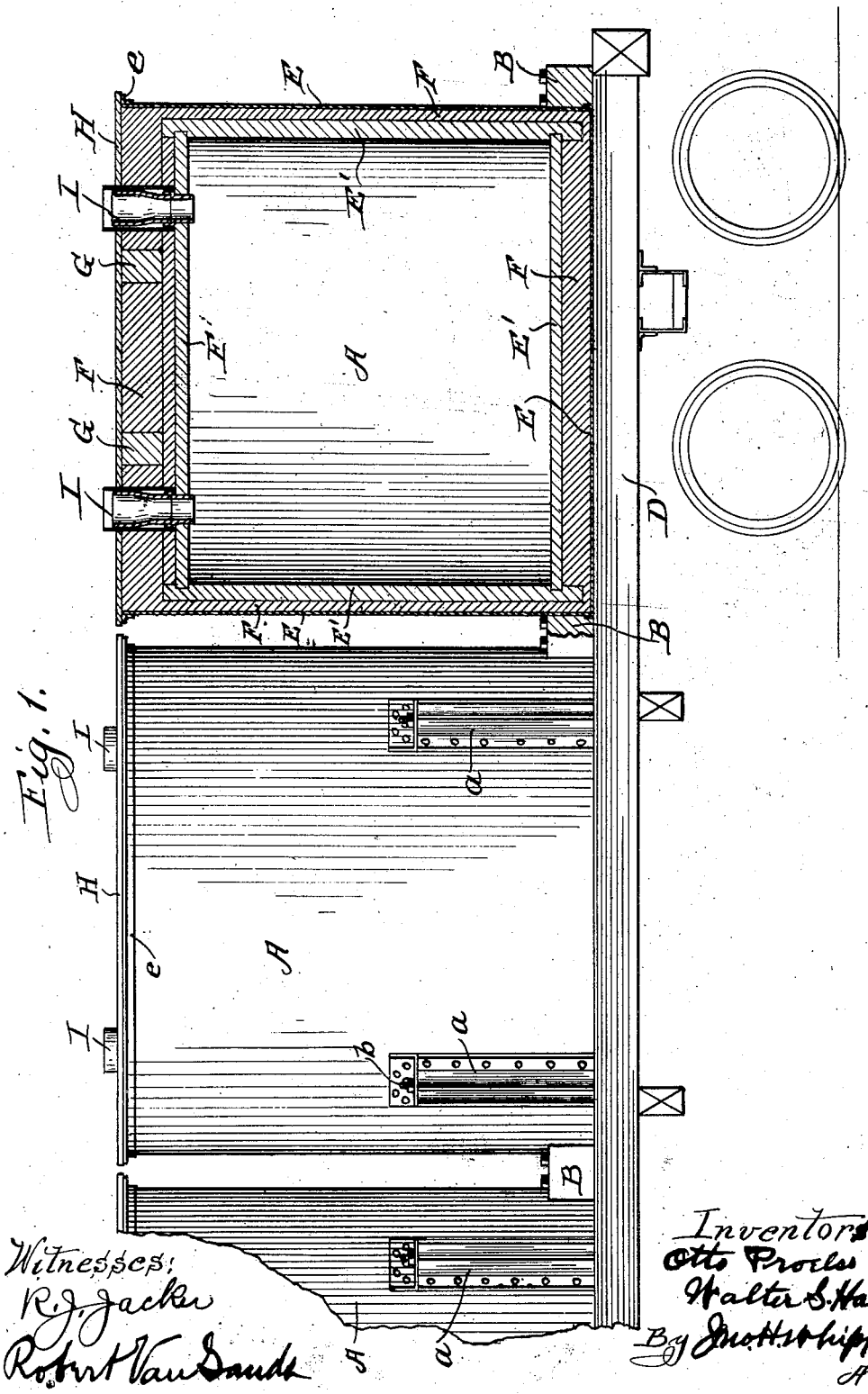
Figure 2:
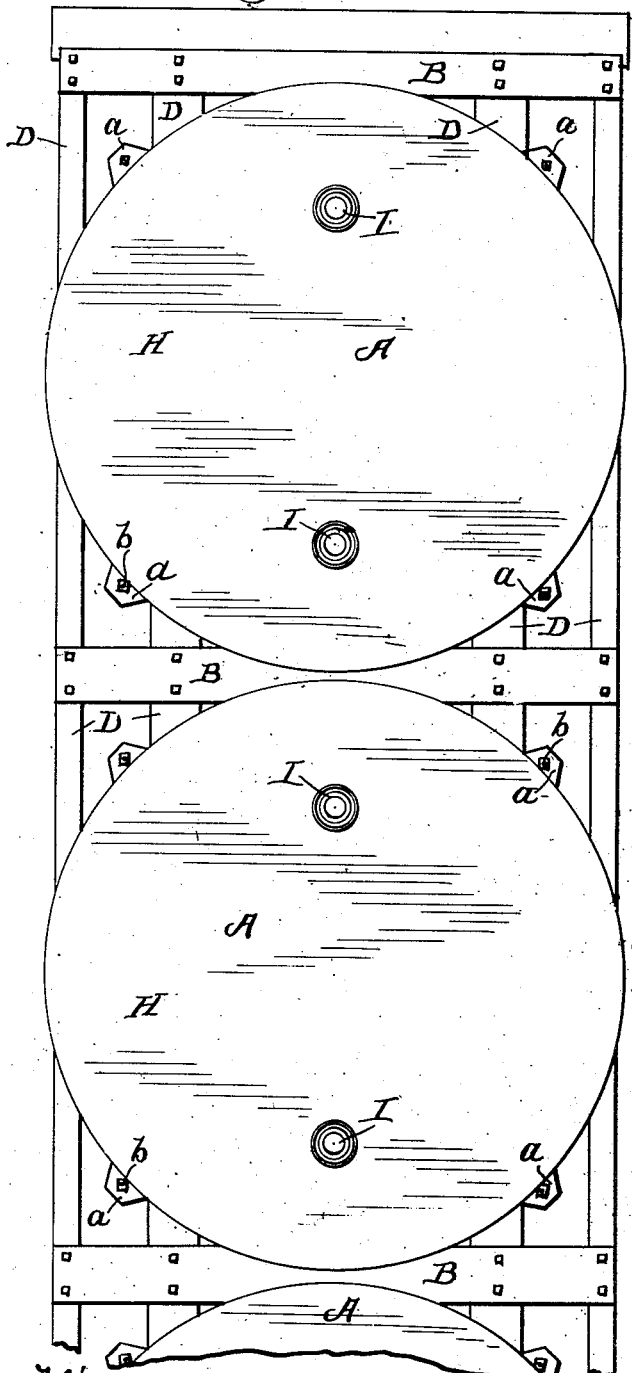
Figure 3:
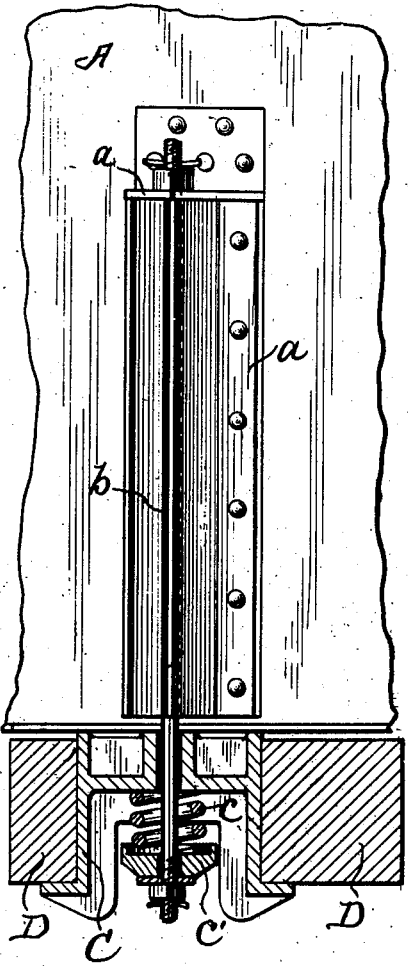

Figure 1 is a fragmentary side elevation partly in section of a tank-car containing our invention, the truck being shown in diagram. Fig. 2 is a plan or top view of the same. Fig. 3 is a detail on an enlarged scale showing one of the yielding fastening devices for attaching the tank to the car platform.

It has been ascertained that liquids heavier than oils cannot be practically transported in horizontal wood-lined tanks mounted on the car platform lengthwise, for the reason that the momentum of such heavier liquids coming under shocks produced by bumping the cars together in the common manner, which is practically unavoidable in handling a train of cars, will burst ends out of the tanks in a very short while. To avoid this strain effect we provide a plurality of upright tanks A, preferably three in number, about eight feet high, the width of the tanks corresponding to the width of the cars, about eight feet, and the three tanks filling the length of the car. By this means the load of acid may be divided into three comparatively short parcels each having a front area substantially equal to or greater than the transverse square of the car and reduced lengths of liquid mass in which the horizontal motion takes place in travel. As a consequence, the divided load produces much less strain upon the car-tanks than the continuous load extended the full length of the car.

The tanks A stand slightly apart upon the car platform and are secured thereto by means of beams B which are centrally recessed to fit the outer contour of the tanks and extended across the car between the tanks to form a uniformly rigid attachment at the bottom of the tanks to the car where the horizontal strain between the car and bottom of the tanks falls when suddenly starting or stopping the car. A further means of securement of the tanks to the car consists of preferably four brackets, $a$ firmly attached to the outer side of the wall of each tank and supporting a threaded rod $b$ which extends down through an opening in the car platform and is connected to a car-spring $c$, substantially similar to car-truck springs, which is set in a follower $c^1$ and adapted to be put under tension by turning either or both of the nuts on the ends of said rod in the appropriate direction.

The frame C, in which the car-spring $c$ is seated, is provided with flanges adapted to engage the under surface of heavy longitudinal beams D of the cars so that said car-springs may be put under increased tension by a lifting strain applied to said rods $b$, which hold the tanks to the car platform. The rods $b$ and their spring connection with the car platform afford a yielding resistance additional to gravity for holding the tanks down upon the platform. Such rod and spring connection is adapted to permit the tanks to tip forward so as to lift the bottom slightly from the car platform at the rear of the tanks in case of severe bumping, without damage to the tanks or injury to their connection with the car, and the tanks, by gravity and the coöperation of said springs, will drop back after such shock to their proper places on the car uninjured.

A tank construction suitable for holding muriatic acid or the like in bulk for transportation is shown in the sectional view at the right in Fig. 1. It is made of an outer vessel E of sheet metal (boiler iron), an inner part $E^1$ of wooden staves and heads which have been boiled in asphaltum, and an asphaltum filling F between the metal and the wooden parts. The boiling of the staves and the heads $E^1$ in asphaltum fits them to take the filling F between them and the metal part when hot or in melted state so as to solidly fill the space without forming bubbles therein. The vessel E is provided with a rim flange e at the top, and cross timbers G are laid inside on the head to support a plank walk H laid on top of the tanks for the brakeman. Plugged openings I are provided in the tank covers for filling and emptying the tanks. The above described tank construction is not claimed in this application but on call for division is reserved for a separate application.

The car used by us is preferably a steel car which may be of any ordinary construction provided with a body or frame to which the beams B can be bolted and with heavy longitudinal beams D adapted to sustain the car-springs c beneath the car body substantially as illustrated and described.

Having described our invention what we claim is—

1. In a tank-car of the class described, the combination with the car body of a plurality of vertical tanks arranged apart from each other and lengthwise of the car body, cross-beams intermediate the tanks and secured to the car platform and vertically yielding connections of the tanks with the car platform, as and for the purpose specified.

2. In a tank-car of the class described, the combination with the car body of a plurality of vertical tanks arranged apart from each other and lengthwise of the car body, vertically yielding means for securing the tanks to the car platform, as and for the purpose specified.

3. In a tank-car of the class specified, the combination with the car body of a plurality of upright tanks arranged apart and lengthwise of the car, brackets springing from the exterior surface of the tank-walls, vertical screw-rods connected at their upper ends with the brackets, and springs secured to the car body beneath the brackets and connected with the lower ends of said rods, and means for putting said vertical rods under the tension of the springs, as and for the purpose specified.

OTTO PROELSS.
WALTER S. HALL.

Witnesses:
J. O. McKee,
Frank Norton.